US012786009B2

(12) United States Patent
Liu

(10) Patent No.: US 12,786,009 B2
(45) Date of Patent: Nov. 3, 2026

(54) NETWORK SWITCH TESTING DEVICE AND METHOD FOR TESTING NETWORK SWITCH

(71) Applicant: Alpha Networks Inc., Hsinchu City (TW)

(72) Inventor: Chun-En Liu, Hsinchu City (TW)

(73) Assignee: Alpha Networks Inc., Hsinchu City (TW)

( * ) Notice: Subject to any disclaimer, the term of this patent is extended or adjusted under 35 U.S.C. 154(b) by 304 days.

(21) Appl. No.: 18/616,192

(22) Filed: Mar. 26, 2024

(65) Prior Publication Data

US 2025/0150303 A1 May 8, 2025

(30) Foreign Application Priority Data

Nov. 7, 2023 (TW) ................................ 112142785

(51) Int. Cl.
*G06F 15/16* (2006.01)
*H04L 12/46* (2006.01)

(52) U.S. Cl.
CPC ................................ *H04L 12/4675* (2013.01)

(58) Field of Classification Search
CPC ............. H04L 12/4675; H04L 41/0806; H04L 45/742; H04L 12/745; H04L 41/0886
See application file for complete search history.

(56) References Cited

U.S. PATENT DOCUMENTS

| | | | | |
|---|---|---|---|---|
| 9,118,561 | B2 * | 8/2015 | Frey | H04L 43/50 |
| 2010/0118885 | A1 * | 5/2010 | Congdon | H04L 49/254 370/419 |
| 2011/0206055 | A1 * | 8/2011 | Leong | H04L 49/30 370/401 |
| 2014/0153441 | A1 * | 6/2014 | Frey | H04L 49/555 370/255 |
| 2014/0269724 | A1 * | 9/2014 | Mehler | H04L 41/0895 370/392 |
| 2015/0124823 | A1 | 5/2015 | Pani et al. | |

(Continued)

FOREIGN PATENT DOCUMENTS

| | | | |
|---|---|---|---|
| CN | 105897494 | A | 8/2016 |
| CN | 103259727 | B | 12/2016 |

(Continued)

*Primary Examiner* — Razu A Miah

(57) ABSTRACT

A network switch testing device and a method for testing at least one network switch as disclosed use software to set the testing device's first acceleration port, second acceleration port and transmission port(s) as the traffic generator, and a user can adjust the packet(s) such as by specifying different packet data, different packet sizes, whether the packet(s) is tagged or untagged, and so on. The first and second acceleration ports use internal loopbacks and virtual local area network's flooding mechanism to make the packet(s) transmitted by the CPU of the testing device to reach a predetermined line rate, and the predetermined-line-rate-reaching packet(s) is transmitted to the transmission port(s) that in turn transmits such predetermined-line-rate-reaching packet (s) to one or more transmission ports to be tested. Different transmission ports can be set to transmit packets at different predetermined line rates, allowing multiple network switches to be tested simultaneously.

10 Claims, 4 Drawing Sheets

1

(56) References Cited

U.S. PATENT DOCUMENTS

| | | | | |
|---|---|---|---|---|
| 2015/0333927 | A1* | 11/2015 | Palazzolo | H04L 41/0803 370/401 |
| 2018/0176150 | A1 | 6/2018 | Meyer et al. | |
| 2019/0052566 | A1* | 2/2019 | Leib | H04L 47/12 |
| 2021/0409293 | A1* | 12/2021 | Selvaraj | H04L 43/026 |
| 2023/0224213 | A1* | 7/2023 | Crossland | H04L 41/0894 709/220 |

FOREIGN PATENT DOCUMENTS

| | | | |
|---|---|---|---|
| CN | 112653593 | A | 4/2021 |
| JP | H18-2006245849 | A | 9/2006 |
| JP | H21-2009225404 | A | 10/2009 |
| JP | H22-2010118823 | A | 5/2010 |
| JP | H29-6171704 | B2 | 8/2017 |
| TW | 201613313 | A | 4/2016 |
| TW | I559704 | B | 11/2016 |
| TW | 202123652 | A | 6/2021 |

* cited by examiner

NETWORK SWITCH TESTING DEVICE AND METHOD FOR TESTING NETWORK SWITCH

CROSS-REFERENCE TO RELATED PATENT APPLICATION

This non-provisional application claims priority to and the benefit of, under 35 U.S.C. § 119(a), Taiwan Patent Application No. 112142785, filed Nov. 7, 2023 in Taiwan. The entire content of the above identified application is incorporated herein by reference.

FIELD

The present disclosure relates to a testing device and a testing method, and more particularly to a network switch testing device and a method for testing at least one network switch.

BACKGROUND

Network switches must have their packet forwarding function tested during the manufacturing process. As the data transfer rate required of a network has increased significantly, it is essential that network switch tests support high data rates, too. Currently, relevant tests in the industry include the loopback test, the saturation test, the line rate test, the line rate unicast test, the snake test, and the external test.

The loopback test involves making the central processing unit (CPU) of a to-be-tested network switch transmit and receive packets in a specific format through the transmission ports of itself and then verify the contents of packets. The loopback test can be used to test not only the packet transmission path, but also whether the transmission from media access control (MAC) to the CPU through direct memory access (DMA) is carried out properly. A drawback of the test, however, lies in the fact that the CPU has to generate packets and also verify the contents of packets, and that in consequence the packet rate cannot be increased.

The saturation test involves setting all the ports of a to-be-tested network switch to the same virtual local area network (VLAN), making the to-be-tested network switch send out packets of different sizes by broadcasting until the lines of the to-be-tested network switch are nearly fully loaded, performing a preliminary packet check, and when the predetermined testing time is up, determining whether any error packet has been received during the predetermined testing time. The saturation test is more likely to detect problems that arise only during high-speed transmission, but the network speed cannot be calculated with precision because the lines are full of differently sized packets.

The line rate test involves setting two of the transmission ports of a to-be-tested network switch to the same VLAN, making the to-be-tested network switch transmit, receive, and forward packets of a fixed length within itself by broadcasting through the VLAN mechanism until the to-be-tested network switch is fully loaded, and calculating the overall transfer rate according to the numbers of the packets transmitted and received and the fixed length. The line rate test, however, cannot use small packets to test network speed because, when it comes to the new systems-on-a-chip (SoC), whose memory management units (MMUs) have limitations on the utilization rates of unknown unicast, multicast, and broadcast for packet transmission and for the distribution of limited resources, a substandard network data transfer rate will result if the sizes of the packets forwarded are smaller than a specific length.

The line rate unicast test involves setting two of the transmission ports of a to-be-tested network switch to the same two VLANs and each to a port-based VLAN; making the to-be-tested network switch transmit, receive, and forward unicast packets of a unified length within itself through external wires, L2 table modification, and the VLAN mechanism until the to-be-tested network switch is fully loaded with packets; and calculating the overall transfer rate according to the numbers of the packets transmitted and received and the fixed length. The line rate unicast test can solve the aforesaid problem of the line rate test (i.e., inability to reach the network data transfer rate standard when forwarding multicast packets smaller than a specific length) but does not comply with the industrial requirement that a network switch should be tested with external network performance testing equipment.

The snake test involves connecting all the transmission ports of a to-be-tested network switch in series and forwarding packets from the first transmission port all the way to the last. As the snake test also requires the CPU of the to-be-tested network switch to both generate and verify packets, the limits of the CPU make it impossible to generate a sufficient number of packets to reach the full line rate.

The external test uses the same settings as the snake test and involves transmitting and receiving packets through external network performance testing equipment in order to calculate the overall transfer rate. While the external test can achieve the full line rate and verify the VLAN functions, the network performance testing equipment on the market (e.g., the Spirent Test Center and IXIA) is very expensive and will incur subsequent maintenance expenses, thus leading to cost-inefficient production. Besides, commercially available network performance testing equipment has a relatively small number of transmission ports and therefore cannot be used to test multiple network switches at the same time, meaning the testing time will be long and the associated costs will be high.

Accordingly, one of the issues addressed in the present disclosure is to increase the accuracy of network switch tests, to reduce the time and cost required for testing high-speed network switches, and to meet the industrial requirement that a network switch should be tested with external network performance testing equipment.

SUMMARY

Certain aspects of the present disclosure are directed to a network switch testing device. The network switch testing device includes: a first acceleration port; a second acceleration port; at least one transmission port that can connect with at least one transmission port of at least one network switch; and a CPU. The CPU can: generate at least one packet; transmit the at least one packet to the first acceleration port; clear the packet count of the first acceleration port, the packet count of the second acceleration port, every packet count of the at least one transmission port of the network switch testing device, and every forwarding list of the at least one transmission port of the network switch testing device; stop MAC address learning of the first acceleration port, MAC address learning of the second acceleration port, and MAC address learning of the at least one transmission port of the network switch testing device; and enable internal loopback in the first acceleration port, and internal loopback in the second acceleration port. The first acceleration port, the second acceleration port and the at least one transmission port of the network switch testing device are set to the same virtual local area network (VLAN). The first acceleration port and the second acceleration port can use internal loopbacks and a flooding mechanism of the VLAN to make the at least one packet reach a predetermined line rate, and transmit the at least one packet that has reached the predetermined line rate to the at least one transmission port of the network switch testing device. The at least one transmission port of the network switch testing device can transmit the at least one packet that has reached the predetermined line rate to the at least one transmission port of the at least one network switch. The CPU can stop the at least one transmission port of the network switch testing device from transmitting the at least one packet when a testing time ends.

In certain embodiments, the network switch testing device is a network switch that has been verified to has the predetermined line rate.

In certain embodiments, the at least one packet specifies at least one of a source address, a destination address, an Ethernet type, packet data, a packet size, and the at least one packet's being tagged or untagged.

In certain embodiments, the at least one transmission port of the network switch testing device is a plurality of transmission ports, the at least one network switch is a plurality of network switches, the predetermined line rate is the same or different for the plurality of transmission ports of the network switch testing device, and the plurality of transmission ports of the network switch testing device simultaneously transmit the at least one packet to corresponding transmission ports of the plurality of network switches through the different or the same predetermined line rate.

In certain embodiments, the CPU stops the at least one transmission port of the network switch testing device from transmitting the at least one packet by clearing the forwarding list of the first acceleration port.

Certain aspects of the present disclosure are directed to a method for testing at least one network switch. The method includes: providing a testing device and at least one network switch, with the testing device including a CPU and a plurality of ports, and with the at least one network switch including at least one transmission port; clearing, by the CPU, VLAN settings of the plurality of ports of the testing device, and setting, by the CPU, one of the plurality of ports of the testing device as a first acceleration port, another one of the ports as a second acceleration port, and at least one of the remaining ports of the testing device as at least one transmission port; clearing, by the CPU, the packet count of the first acceleration port, the packet count of the second acceleration port, and every packet count of the at least one transmission port of the testing device, and clearing, by the CPU, every forwarding list of the at least one transmission port of the testing device; stopping, by the CPU, MAC address learning of the first acceleration port, MAC address learning of the second acceleration port, and MAC address learning of the at least one transmission port of the testing device; enabling, by the CPU, internal loopback in the first acceleration port and internal loopback in the second acceleration port; setting, by the CPU, the first acceleration port, the second acceleration port, and the at least one transmission port of the testing device to the same VLAN; transmitting, by the CPU, at least one packet to the first acceleration port; making, by the first acceleration port and the second acceleration port, the at least one packet reach a predetermined line rate through internal loopback and the flooding mechanism of the VLAN, and transmitting, by the first acceleration port and the second acceleration port, the at least one packet to the at least one transmission port of the testing device; transmitting, by the at least one transmission port of the testing device, the predetermined-line-rate-reaching at least one packet to the at least one transmission port of the at least one network switch, and receiving, by the at least one transmission port of the testing device or another port of the testing device, the at least one packet transmitted by the at least one transmission port of the at least one network switch; stopping, by the CPU, the at least one transmission port of the testing device from transmitting the at least one packet when a testing time ends; and determining a packet transmission quality of the at least one network switch according to the number of the at least one packet transmitted by the testing device and the number of the at least one packet received by the testing device.

In certain embodiments, in the method, the at least one packet specifies at least one of a source address, a destination address, an Ethernet type, packet data, a packet size, and the at least one packet's being tagged or untagged.

In certain embodiments, in the method, the at least one transmission port of the testing device is a plurality of transmission ports, the at least one network switch is a plurality of network switches, the predetermined line rate is the same or different for the plurality of transmission ports of the testing device, and the plurality of transmission ports of the testing device simultaneously transmit the at least one packet to corresponding transmission ports of the plurality of network switches through the different or the same predetermined line rate.

In certain embodiments, the method further including, before the step of transmitting the at least one packet to the first acceleration port, presetting the testing time by a timer.

In certain embodiments, in the method, the CPU stops the at least one transmission port of the testing device from transmitting the at least one packet by clearing the forwarding list of the first acceleration port.

The device and method in the present disclosure for testing at least one network switch use software to set the first acceleration port, the second acceleration port and the transmission port(s) of the testing device as the traffic generator, and a user can adjust the packet(s) according to practical needs by, for example but not limited to, specifying different packet data, different packet sizes, whether the packet(s) is tagged or untagged, etc. Moreover, different transmission ports can be set to transmit packets at different predetermined line rates, thereby allowing multiple to-be-tested network switches to be tested simultaneously. This not only complies with the testing requirements of the industry, but also can increase the scope and accuracy of tests and greatly reduce the time and cost required for testing so that the production capacity of network switches can be raised.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
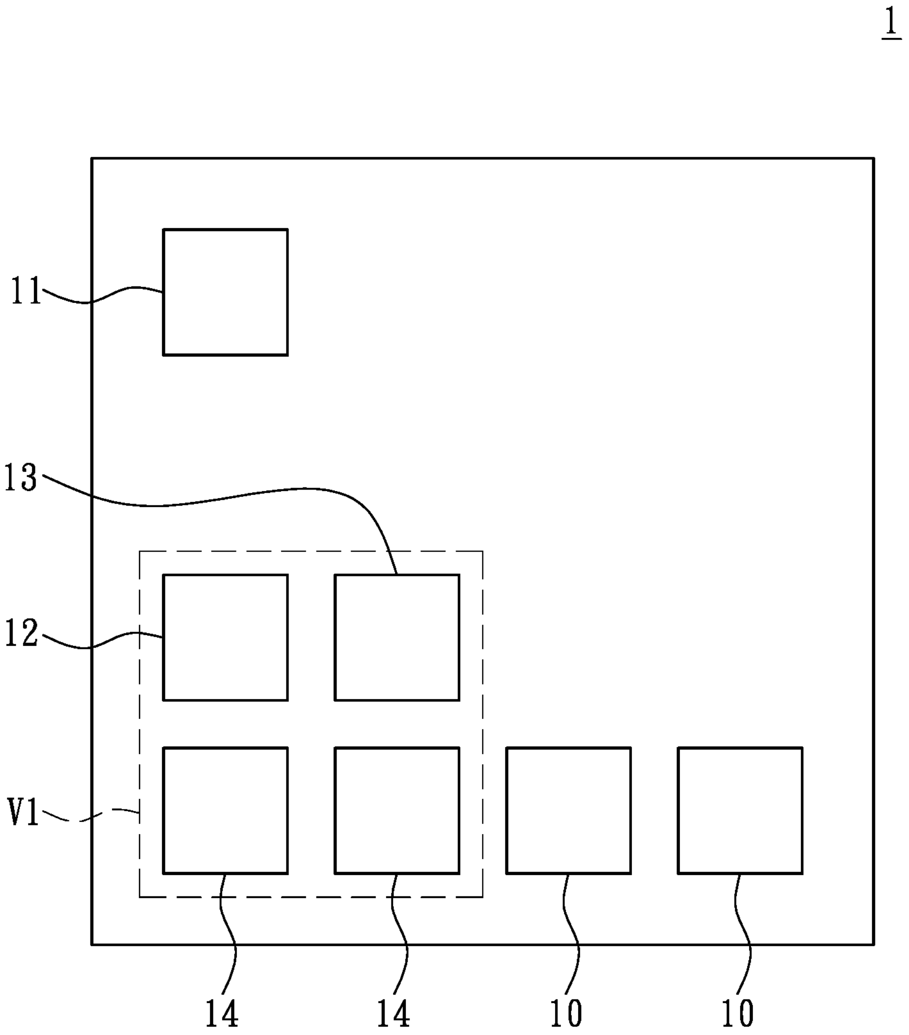
FIG. 1 is a block diagram of a testing device for testing at least one network switch according to certain embodiments in the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, materials, objects, or the like, which are for distinguishing one component/material/object from another one only, and are not intended to, nor should be construed to impose any substantive limitations on the components, materials, objects, or the like.

FIG. 1 is a block diagram of a testing device for testing at least one network switch (hereinafter also referred to as a network switch testing device or a testing device for short) according to certain embodiments in the present disclosure. As shown in FIG. 1, the network switch testing device 1 includes a CPU 11, a first acceleration port 12, a second acceleration port 13, and a plurality of transmission ports 14. The CPU 11, the first acceleration port 12, the second acceleration port 13, and the transmission ports 14 are connected through lines in the testing device 1. The transmission ports 14 are configured to connect with plural to-be-tested transmission ports of at least one to-be-tested network switch (not shown) through external lines.

For example, a to-be-tested network switch can be an Ethernet switch, and the network switch testing device 1 can be an Ethernet switch that has been verified to have the desired line rate (e.g., 100 Gb/s, 200 Gb/s, 400 Gb/s, 800 Gb/s, or higher) and specifications. The network switch testing device 1 includes the CPU 11 and a plurality of ports 10 and stores software for the Ethernet traffic generator (ETG) in the present disclosure. Before testing a network switch, the CPU 11 performs the following procedures: clearing the VLAN settings of all the ports 10; setting one of the ports 10 as the first acceleration port 12, another port 10 as the second acceleration port 13, and some of the remaining ports 10 as the transmission ports 14; setting the first acceleration port 12, the second acceleration port 13, and the transmission ports 14 to the same VLAN V1; clearing the packet count of the first acceleration port 12, stopping MAC address learning of the first acceleration port 12, and enabling internal loopback in the first acceleration port 12; clearing the packet count of the second acceleration port 13, stopping MAC address learning of the second acceleration port 13, and enabling internal loopback in the second acceleration port 13; and clearing every packet count of and every forwarding list of the transmission ports 14, and stopping MAC address learning of the transmission ports 14. With the ETG software, the CPU 11 can set the first acceleration port 12, the second acceleration port 13 and the transmission ports 14 as the traffic generator.

When testing a network switch, the CPU 11 generates at least one type of packets and transmits the packet(s) to the first acceleration port 12. The first acceleration port 12 and the second acceleration port 13 use internal loopbacks and the flooding mechanism of the VLAN V1 to make the packet(s) reach a predetermined line rate, and transmit the predetermined-line-rate-reaching packet(s) to the transmission port(s) 14, wherein the predetermined line rate can be determined according to the full line rate of the to-be-tested network switch. The transmission port(s) 14 transmit the packet(s) that has reached the predetermined line rate to the to-be-tested transmission port(s) of the to-be-tested network switch(s), and receive the packet(s) sent back from the to-be-tested transmission port(s). When the testing time ends, the CPU 11 stops the transmission port(s) 14 from transmitting packet(s). The quality of packet transmission by the to-be-tested network switch(es) (including the correctness of the number of packets, the existence/absence of error packets, and whether or not the packet sizes are as expected) can be determined according to the numbers of the packet(s) transmitted and received by the testing device 1.

Figure 2A:
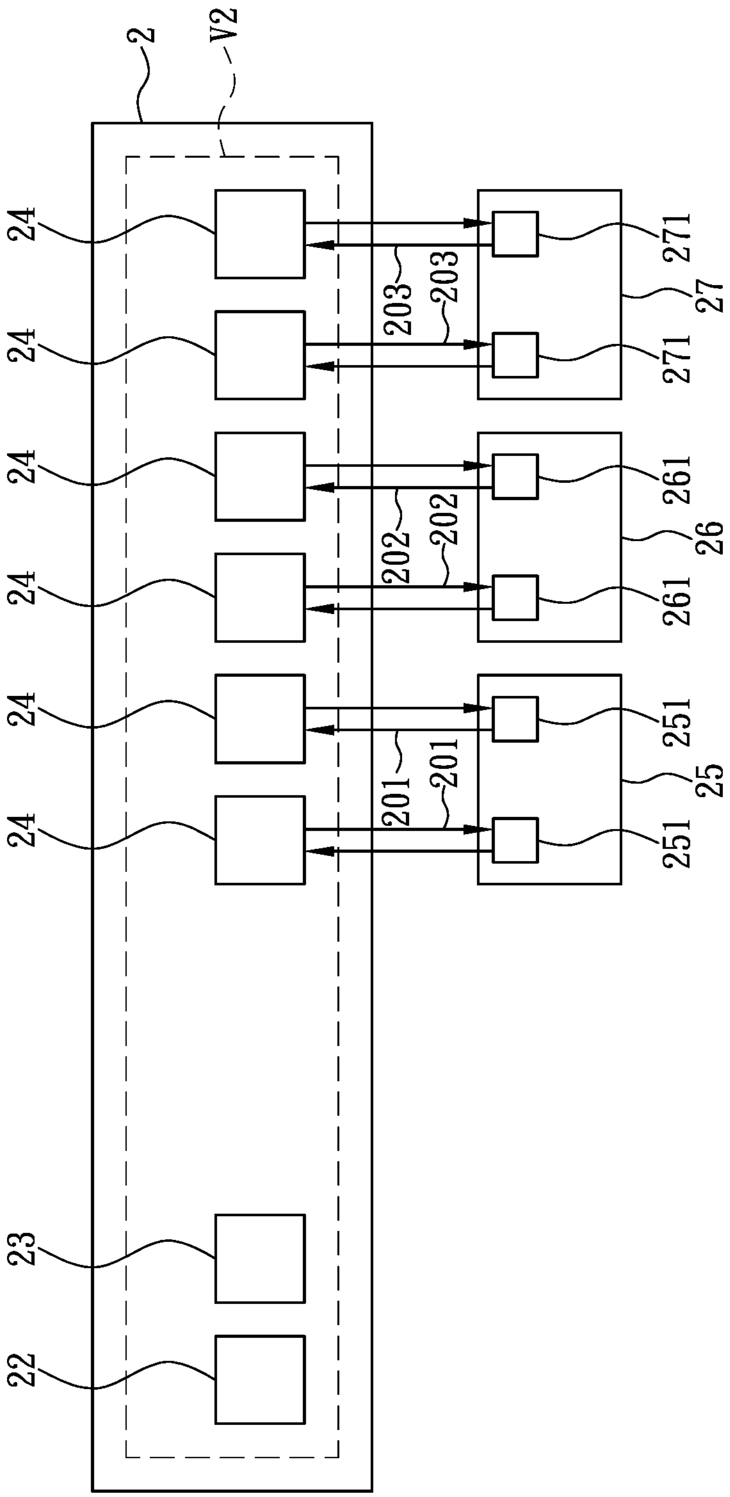
FIG. 2A schematically shows a two-way packet transmission test performed by the network switch testing device according to certain embodiment in the present disclosure.

FIG. 2A schematically shows a two-way packet transmission test performed by a network switch testing device according to certain embodiment in the present disclosure. As shown in FIG. 2A, the network switch testing device 2 includes a CPU (not shown), a first acceleration port 22, a second acceleration port 23, and a plurality of transmission ports 24. The CPU, the first acceleration port 22, the second acceleration port 23, and the transmission ports 24 are connected through lines in the testing device 2. Six of the transmission ports 24 are, in groups of two, connected to the two to-be-tested transmission ports 251 of the to-be-tested network switch 25, the two to-be-tested transmission ports 261 of the to-be-tested network switch 26, and the two to-be-tested transmission ports 271 of the to-be-tested network switch 27 through external lines 201, 202, and 203 respectively. The first acceleration port 22, the second acceleration port 23, and the transmission ports 24 can be set according to the following configuration.

The network switch testing device 2 includes the CPU and a plurality of ports and stores software for the ETG according to certain embodiments in the present disclosure. Before testing the network switches 25, 26, and 27, the CPU performs the following procedures according to the ETG software: clearing the VLAN settings of all the ports of the network switch testing device 2; setting one of the ports as the first acceleration port 22, another port as the second acceleration port 23, and all or some of the remaining ports as the transmission ports 24; setting the first acceleration port 22, the second acceleration port 23, and the six transmission ports 24 connected to the to-be-tested transmission ports 251, 261, and 271 to the same VLAN V2; clearing the packet counts of the first acceleration port 22, the second acceleration port 23, and the six transmission ports 24 connected to the to-be-tested transmission ports 251, 261, and 271; stopping MAC address learning of the first acceleration port 22, of the second acceleration port 23, and of the six transmission ports 24 connected to the to-be-tested transmission ports 251, 261, and 271; enabling internal loopback in the first acceleration port 22 and in the second acceleration port 23; and clearing the forwarding lists of the six transmission ports 24 connected to the to-be-tested transmission ports 251, 261, and 271.

A user can use the CPU to generate identical or different packets and to set the predetermined line rate of each transmission port 24 in order to perform a simultaneous two-way test on the three to-be-tested network switches 25, 26, and 27. The packet(s) can be adjusted according to practical needs, for example, specifying, among others, the source address, destination address, Ethernet type, packet data, packet size, and whether the packet(s) is tagged or untagged. The predetermined line rate at which each transmission port 24 transmits one or more packets can be the same as or different from that of another transmission port 24.

In certain embodiments, when testing the to-be-tested network switches 25, 26, and 27, the CPU generates a certain number (e.g., a number containing only the units digit, or a number containing the tens and units digits, or a number containing the hundreds, tens, and units digits) of packets of two types and transmits the two types of packets to the first acceleration port 22. The two types of packets are then looped back in the first acceleration port 22. As the first acceleration port 22 and the second acceleration port 23 are set to the same VLAN V2, the two types of packets will, after being looped back in the first acceleration port 22, be flooded to the second acceleration port 23, looped back in the second acceleration port 23, and then flooded to the first acceleration port 22. After circulating between the first acceleration port 22 and the second acceleration port 23 for a certain amount of time, the two types of packets reach the predetermined line rate. The predetermined line rate can be determined according to the full line rate of each to-be-tested network switch 25, 26, or 27. For example, in order to verify at the same time the to-be-tested network switches 25 and 26, whose design line rates can exemplarily be 400 Gb/s, and the to-be-tested network switch 27, whose design line rate can exemplarily be 100 Gb/s, the line rates of the transmission ports 24 connected to the to-be-tested network switches 25 and 26 may be set at 400 Gb/s, and the line rates of the transmission ports 24 connected to the to-be-tested network switch 27 may be set at 100 Gb/s. Since the six transmission ports 24 connected to the to-be-tested transmission ports 251, 261, and 271 are also set to the VLAN V2, the two types of packets in the first acceleration port 22 and the second acceleration port 23 will be flooded to the six transmission ports 24 connected to the to-be-tested transmission ports 251, 261, and 271, too, and each of the six transmission ports 24 will in turn transmit the two types of packets that have reached the predetermined line rate to the corresponding to-be-tested transmission port 251, 261, or 271. After receiving the packets, each of the three to-be-tested network switches 25, 26, and 27 sends the packets back to the corresponding transmission ports 24 through the to-be-tested transmission ports 251, 261, or 271.

Figure 2B:
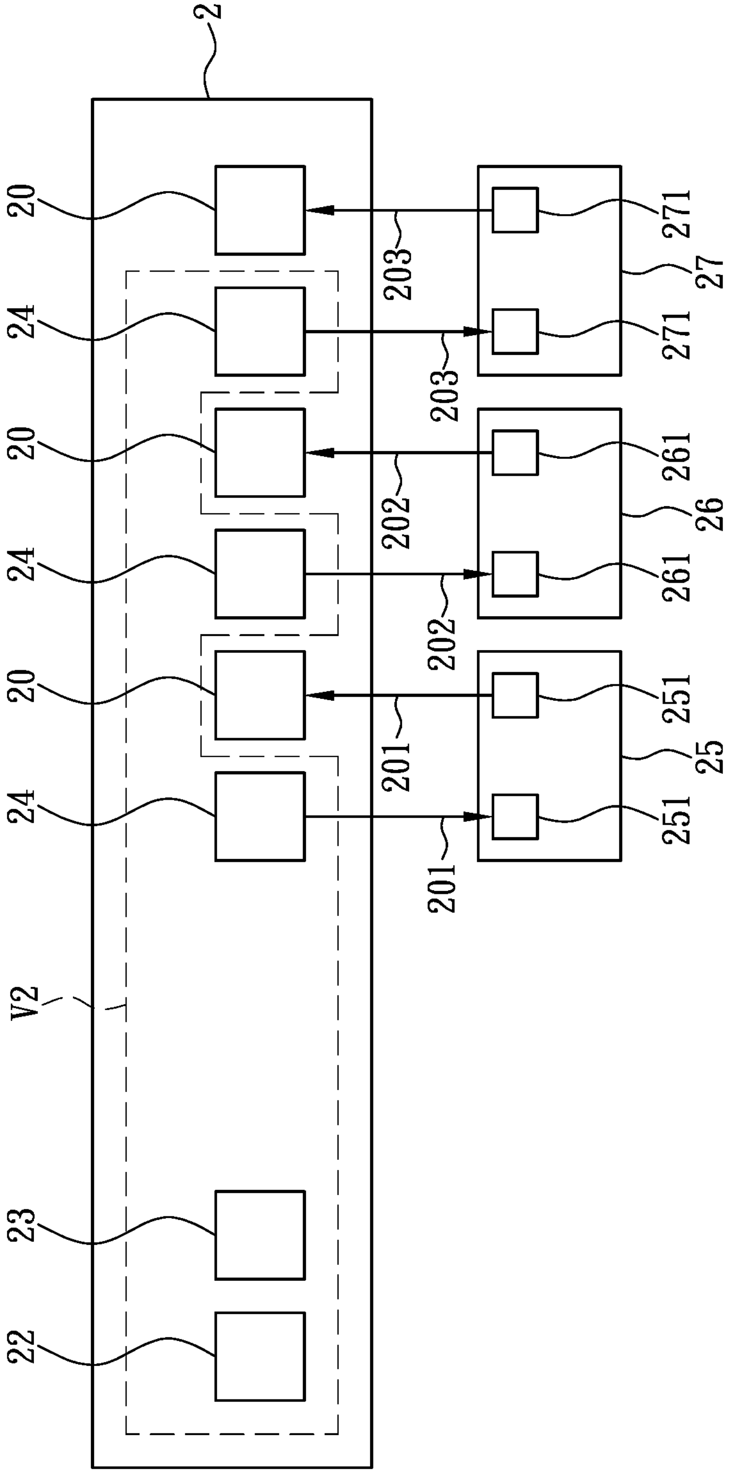
FIG. 2B schematically shows a one-way packet transmission test performed by the network switch testing device according to certain embodiments in the present disclosure.

FIG. 2B schematically shows a one-way packet transmission test performed by a network switch testing device according to certain embodiments in the present disclosure. As shown in FIG. 2B, the network switch testing device 2 includes a CPU (not shown), a first acceleration port 22, a second acceleration port 23, transmission ports 24, and ports 20. The CPU, the first acceleration port 22, the second acceleration port 23, the transmission ports 24, and the ports 20 are connected through lines in the testing device 2. The transmission ports 24 and the ports 20 are, in pairs of a transmission port 24 and a port 20, connected to the two to-be-tested transmission ports 251 of the to-be-tested network switch 25, the two to-be-tested transmission ports 261 of the to-be-tested network switch 26, and the two to-be-tested transmission ports 271 of the to-be-tested network switch 27 through external lines 201, 202, and 203 respectively. The first acceleration port 22, the second acceleration port 23, and the transmission ports 24 can be set according to the following configuration.

The network switch testing device 2 includes the CPU and a plurality of ports and stores software for the ETG according to certain embodiments in the present invention. Before testing the network switches 25, 26, and 27, the CPU performs the following procedures: clearing the VLAN settings of all the ports of the network switch testing device 2; setting one of the ports as the first acceleration port 22, another port as the second acceleration port 23, and some of the remaining ports as the transmission ports 24; setting the first acceleration port 22, the second acceleration port 23, and the transmission ports 24 to the same VLAN V2 while the ports 20, which are left unset, are outside the VLAN V2 and will not transmit packets to the other ports; clearing the packet counts of the first acceleration port 22, the second acceleration port 23, and the transmission ports 24; stopping MAC address learning of the first acceleration port 22, of the second acceleration port 23, and of the transmission ports 24; enabling internal loopbacks in the first acceleration port 22 and in the second acceleration port 23; and clearing the forwarding lists of the transmission ports 24.

When testing the to-be-tested network switches 25, 26, and 27, the CPU generates a certain number (e.g., a number containing only the units digit, or a number containing the tens and units digits, or a number containing the hundreds, tens, and units digits) of packets and transmits the packets to the first acceleration port 22. The packets are then looped back in the first acceleration port 22. As the first acceleration port 22 and the second acceleration port 23 are set to the same VLAN V2, the packets will, after being looped back in the first acceleration port 22, be flooded to the second acceleration port 23, looped back in the second acceleration port 23, and then flooded to the first acceleration port 22. After circulating between the first acceleration port 22 and the second acceleration port 23 for a certain amount of time, the packets reach the predetermined line rate. The predetermined line rate can be determined according to the full line rate of each to-be-tested network switch 25, 26, or 27. For example, in order to verify at the same time the to-be-tested network switches 25 and 26, whose design line rates can exemplarily be 400 Gb/s, and the to-be-tested network switch 27, whose design line rate can exemplarily be 100 Gb/s, the line rates of the transmission ports 24 connected to the to-be-tested network switches 25 and 26 may be set at 400 Gb/s, and the line rate of the transmission port 24 connected to the to-be-tested network switch 27 may be set at 100 Gb/s. Since the transmission ports 24 connected to the to-be-tested transmission ports 251, 261, and 271 are also set to the VLAN V2, the packets in the first acceleration port 22 and the second acceleration port 23 will be flooded to the transmission ports 24 connected to the to-be-tested transmission ports 251, 261, and 271, too, and each transmission port 24 will in turn transmit the packets that have reached the predetermined line rate to the corresponding to-be-tested transmission port 251, 261, or 271. After receiving the packets, each of the three to-be-tested network switches 25, 26, and 27 sends the packets to a corresponding port 20 through a corresponding to-be-tested transmission port 251, 261, or 271 that is different from the to-be-tested transmission port through which the packets were received by the same to-be-tested network switch.

In either the two-way or the one-way packet transmission test, a user may set the testing time in advance or decide the testing time during the test. For example, if it is desired to transmit packets for five minutes, the user may preset the testing time at five minutes or stop the transmission of packets with an instruction given at the end of the five-minute period. When the testing time is up, the CPU will clear the forwarding list of the first acceleration port 22 to stop packet flooding, and the transmission ports 24 will immediately stop transmitting packets. The forwarding list of the first acceleration port 22 will be restored after a certain time (e.g., 0.2 second) so that the next test can be carried out. The user may connect an external computer device to the CPU of the testing device 2 in order to determine the line rates and quality (including, for example, the loss rate and error rate of the packets transmitted and received) of the to-be-tested network switches 25, 26, and 27 based on the numbers of the packets transmitted and received by the transmission ports 24 and the testing time.

The network switch testing device according to the present disclosure is so designed that it can transmit specified packets at a predetermined line rate, and that a user can adjust the packet(s) according to practical needs by, for example but not limited to, specifying different packet data, different packet sizes, whether the packet(s) is tagged or untagged, etc., so as to increase the scope and accuracy of tests. The existing network switches have as many as 32 or 48 ports. Using software settings to convert a network switch that has been verified to meet product specifications into a testing device makes it possible to test multiple network switches (up to X network switches, wherein X is (N−2)/2, and N is the number of ports) simultaneously, which greatly reduces the time and cost required for testing and thereby increases the production capacity of network switches.

Figure 3:
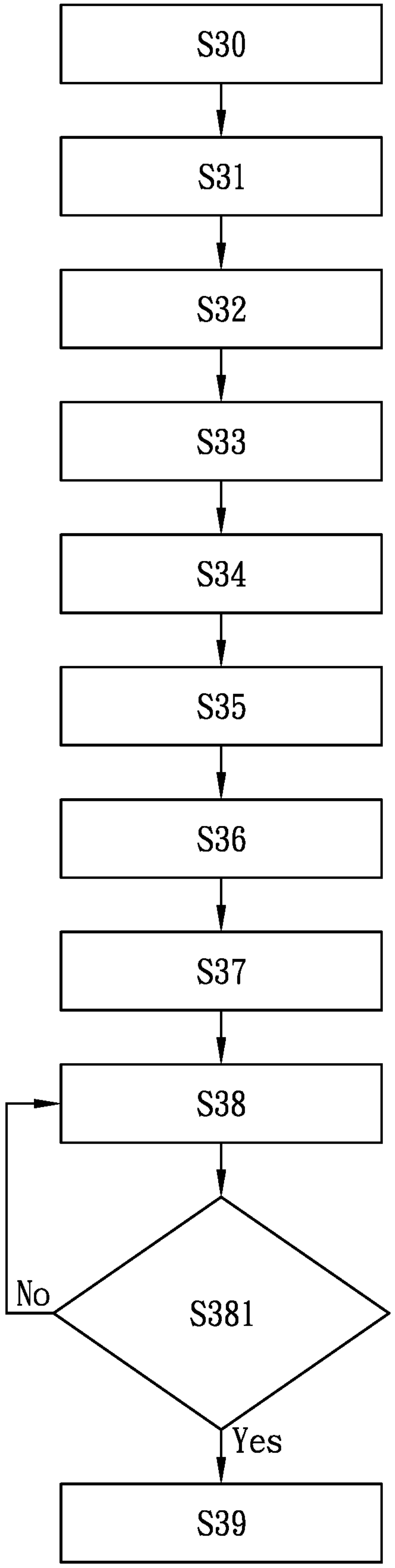
FIG. 3 is a flowchart of a method for testing at least one network switch according to certain embodiments in the present disclosure.

FIG. 3 is a flowchart of a testing method for testing at least one network switch according to certain embodiments in the present disclosure. As shown in FIG. 3, the method for testing at least one network switch includes:

Step S30: Providing a testing device and at least one to-be-tested network switch, wherein the testing device includes a CPU and a plurality of ports, and the at least one to-be-tested network switch includes a plurality of to-be-tested transmission ports;

Step S31: Clearing, by the CPU, the VLAN settings of all the ports, and setting, by the CPU, one of the ports as a first acceleration port, another one of the ports as a second acceleration port, and at least one of the remaining port(s) as a transmission port;

Step S32: Clearing, by the CPU, the packet count of the first acceleration port, the packet count of the second acceleration port, and every packet count of the at least one transmission port, and clearing, by the CPU, every forwarding list of the at least one transmission port;

Step S33: Stopping, by the CPU, MAC address learning of the first acceleration port, of the second acceleration port, and of the at least one transmission port;

Step S34: Enabling, by the CPU, internal loopbacks in the first acceleration port and in the second acceleration port;

Step S35: Setting, by the CPU, the first acceleration port, the second acceleration port, and the transmission port to the same VLAN;

Step S36: Transmitting, by the CPU, one or more packets to the first acceleration port;

Step S37: Making, by the first acceleration port and the second acceleration port, the one or more packets reach a predetermined line rate through internal loopback and the flooding mechanism of the VLAN, and transmitting, by the first acceleration port and the second acceleration port, the one or more packets to the at least one transmission port;

Step S38: Transmitting, by the at least one transmission port of the testing device, one or more packets that have reached the predetermined line rate to at least one of the to-be-tested transmission ports of the to-be-tested network switch, and receiving, by the at least one transmission port or another port of the testing device, one or more packets transmitted by the at least one to-be-tested transmission port;

Step S381: Determining whether or not the testing time is up. In response to determining the testing time is not up, returning to Step S38. In response to determining the testing time is up, proceed to Step S39; and Step S39: Stopping, by the CPU, the at least one transmission port from transmitting packets when the testing time is up, and determining, by the CPU, the packet transmission quality of the at least one to-be-tested network switch according to the numbers of the packet(s) transmitted and received by the testing device.

For example, the at least one to-be-tested network switch can be an Ethernet switch, and the testing device can be an Ethernet switch that has been verified to have the desired line rate (e.g., 100 Gb/s, 200 Gb/s, 400 Gb/s, 800 Gb/s, or higher) and specifications. The packets can be of the same type or of different types, and the packets can be adjusted according to practical needs, for example, specifying, among others, the source address, destination address, Ethernet type, packet data, packet size, and whether the packets are tagged or untagged. To test multiple to-be-tested network switches at the same time, different transmission ports can be used to transmit packets at different predetermined line rates, and the different predetermined line rates can be set according to the requirement of each to-be-tested network switch.

It is worth mentioning that there is no limitation on the order in which Steps S32 to S35 are performed. Prior to Step S36, a user may preset the testing time using the timer of the CPU. The option of providing a preset testing time allows the user to determine the time at which the test starts and ends, and hence the duration of the test, thereby adding to the flexibility of testing. In Step S39, the CPU may clear the forwarding list of the first acceleration port to stop the transmission port(s) from transmitting the packet(s), and after a certain time (e.g., 0.2 second) following the completion of Step S39, the CPU may restore the forwarding list of the first acceleration port in preparation for the next test.

According to the above, the testing device and method in the present disclosure for testing at least one network switch use software to set the first acceleration port, the second acceleration port and the transmission port(s) of the testing device as the traffic generator, and a user can adjust the packet(s) according to practical needs by, for example but not limited to, specifying different packet data, different packet sizes, whether the packet(s) is tagged or untagged, etc. Moreover, different transmission ports can be set to transmit packets at different predetermined line rates, thereby allowing multiple to-be-tested network switches to be tested simultaneously. This not only complies with the testing requirements of the industry, but also can increase the scope and accuracy of tests and greatly reduce the time and cost required for testing so that the production capacity of network switches can be raised.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A network switch testing device, comprising:

a first acceleration port;

a second acceleration port;

at least one transmission port configured to connect with at least one transmission port of at least one network switch; and a central processing unit (CPU) configured to:

generate at least one packet;

transmit the at least one packet to the first acceleration port;

clear a packet count of the first acceleration port, a packet count of the second acceleration port, every packet count of the at least one transmission port of the network switch testing device, and every forwarding list of the at least one transmission port of the network switch testing device;

stop media access control (MAC) address learning of the first acceleration port, MAC address learning of the second acceleration port, and MAC address learning of the at least one transmission port of the network switch testing device; and enable internal loopback in the first acceleration port, and internal loopback in the second acceleration port, wherein the first acceleration port, the second acceleration port and the at least one transmission port of the network switch testing device are set to the same virtual local area network (VLAN), the first acceleration port and the second acceleration port are configured to use internal loopbacks and a flooding mechanism of the VLAN to make the at least one packet reach a predetermined line rate, and transmit the at least one packet that has reached the predetermined line rate to the at least one transmission port of the network switch testing device, the at least one transmission port of the network switch testing device is configured to transmit the at least one packet that has reached the predetermined line rate to the at least one transmission port of the at least one network switch, and the CPU is configured to stop the at least one transmission port of the network switch testing device from transmitting the at least one packet when a testing time ends.

2. The network switch testing device according to claim 1, wherein the network switch testing device is a network switch that has been verified to has the predetermined line rate.

3. The network switch testing device according to claim 1, wherein the at least one packet specifies at least one of a source address, a destination address, an Ethernet type, packet data, a packet size, and the at least one packet's being tagged or untagged.

4. The network switch testing device according to claim 1, wherein the at least one transmission port of the network switch testing device is a plurality of transmission ports, the at least one network switch is a plurality of network switches, the predetermined line rate is the same or different for the plurality of transmission ports of the network switch testing device, and the plurality of transmission ports of the network switch testing device simultaneously transmit the at least one packet to corresponding transmission ports of the plurality of network switches through the different or the same predetermined line rate.

5. The network switch testing device according to claim 1, wherein the CPU stops the at least one transmission port of the network switch testing device from transmitting the at least one packet by clearing a forwarding list of the first acceleration port.

6. A method for testing at least one network switch, comprising:

providing a testing device and at least one network switch, wherein the testing device comprises a central processing unit (CPU) and a plurality of ports, and the at least one network switch comprises at least one transmission port;

clearing, by the CPU, virtual local area network (VLAN) settings of the plurality of ports of the testing device, and setting, by the CPU, one of the plurality of ports of the testing device as a first acceleration port, another one of the ports as a second acceleration port, and at least one of the remaining ports of the testing device as at least one transmission port;

clearing, by the CPU, a packet count of the first acceleration port, a packet count of the second acceleration port, and every packet count of the at least one transmission port of the testing device, and clearing, by the CPU, every forwarding list of the at least one transmission port of the testing device;

stopping, by the CPU, media access control (MAC) address learning of the first acceleration port, MAC address learning of the second acceleration port, and MAC address learning of the at least one transmission port of the testing device;

enabling, by the CPU, internal loopback in the first acceleration port and internal loopback in the second acceleration port;

setting, by the CPU, the first acceleration port, the second acceleration port, and the at least one transmission port of the testing device to the same VLAN;

transmitting, by the CPU, at least one packet to the first acceleration port;

making, by the first acceleration port and the second acceleration port, the at least one packet reach a predetermined line rate through internal loopback and a flooding mechanism of the VLAN, and transmitting, by the first acceleration port and the second acceleration port, the at least one packet to the at least one transmission port of the testing device;

transmitting, by the at least one transmission port of the testing device, the predetermined-line-rate-reaching at least one packet to the at least one transmission port of the at least one network switch, and receiving, by the at least one transmission port of the testing device or another port of the testing device, the at least one packet transmitted by the at least one transmission port of the at least one network switch;

stopping, by the CPU, the at least one transmission port of the testing device from transmitting the at least one packet when a testing time ends; and determining a packet transmission quality of the at least one network switch according to a number of the at least one packet transmitted by the testing device and a number of the at least one packet received by the testing device.

7. The method according to claim 6, wherein the at least one packet specifies at least one of a source address, a destination address, an Ethernet type, packet data, a packet size, and the at least one packet's being tagged or untagged.

8. The method according to claim 6, wherein the at least one transmission port of the testing device is a plurality of transmission ports, the at least one network switch is a plurality of network switches, the predetermined line rate is the same or different for the plurality of transmission ports of the testing device, and the plurality of transmission ports of the testing device simultaneously transmit the at least one packet to corresponding transmission ports of the plurality of network switches through the different or the same predetermined line rate.

9. The method according to claim 6, further including, before the step of transmitting the at least one packet to the first acceleration port, presetting the testing time by a timer.

10. The method according to claim 6, wherein the CPU stops the at least one transmission port of the testing device from transmitting the at least one packet by clearing a forwarding list of the first acceleration port.

* * * * *